United States Patent [19]
Mele

[11] Patent Number: 5,911,497
[45] Date of Patent: Jun. 15, 1999

[54] MULTI-BATTERY FLASHLIGHT

[76] Inventor: Scott A. Mele, 2230 S. Clinton Ave., Hamilton Township, N.J. 08610

[21] Appl. No.: 08/995,549

[22] Filed: Dec. 22, 1997

[51] Int. Cl.⁶ ..................................................... F21L 15/12
[52] U.S. Cl. .......................... 362/202; 362/191; 362/202; 362/206; 362/207
[58] Field of Search .................................. 362/191, 399, 362/202, 206, 207

[56] References Cited

U.S. PATENT DOCUMENTS

| | | | |
|---|---|---|---|
| 1,307,868 | 6/1919 | Lynne . | |
| 4,205,121 | 5/1980 | Naitch . | |
| 4,535,397 | 8/1985 | May | 362/369 |
| 4,704,663 | 11/1987 | Osashi | 362/206 |
| 4,951,183 | 8/1990 | Wang | 362/187 |
| 4,985,812 | 1/1991 | Uke | 362/158 |
| 5,349,512 | 9/1994 | Parker | 362/399 |
| 5,353,208 | 10/1994 | Moore | 362/202 |
| 5,357,411 | 10/1994 | Menke et al. | 362/183 |
| 5,466,545 | 11/1995 | Chamberlain et al. . | |
| 5,489,486 | 2/1996 | Glover . | |

*Primary Examiner*—Frank G. Font
*Assistant Examiner*—Marshall Honeyman
*Attorney, Agent, or Firm*—Donald S. Cohen

[57] ABSTRACT

A flashlight includes a housing having an outer wall, a closed end and an open end. The outer wall is in the form of three semi-cylindrical portions forming within the housing three parallel pockets each of which is adapted to receive a stack of at least two batteries. A cap is threaded on the open end of the housing. The cap has therein a light bulb, a conical reflector and a lens across its end through which light from the light bulb can flow. Contact strips in the cap and contact springs in the bottom of the housing are adapted to connect the batteries and the light bulb in series. A switch is in the handle and is adapted to turn the light bulb off and on. A handle is removably mounted on the outer surface of the housing and extends radially from the housing.

12 Claims, 3 Drawing Sheets

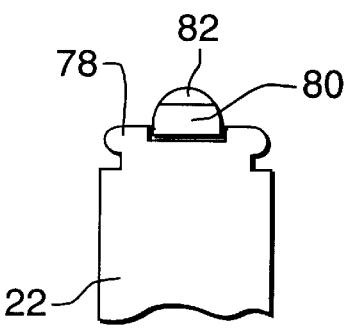
FIG. 3
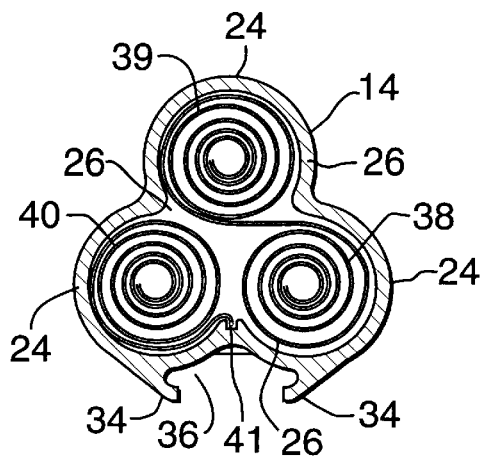
FIG. 4
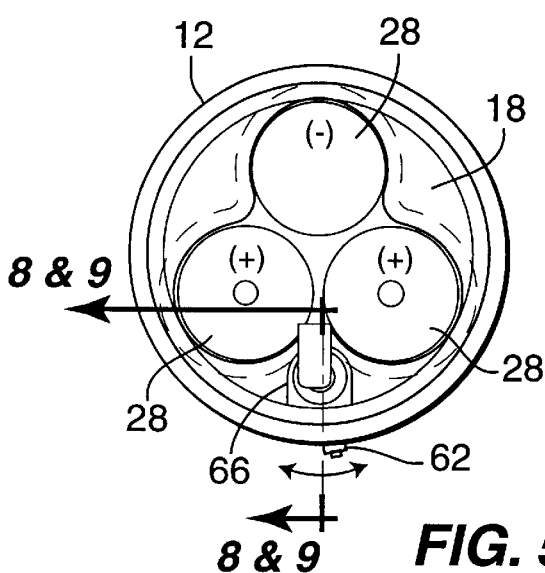
FIG. 5
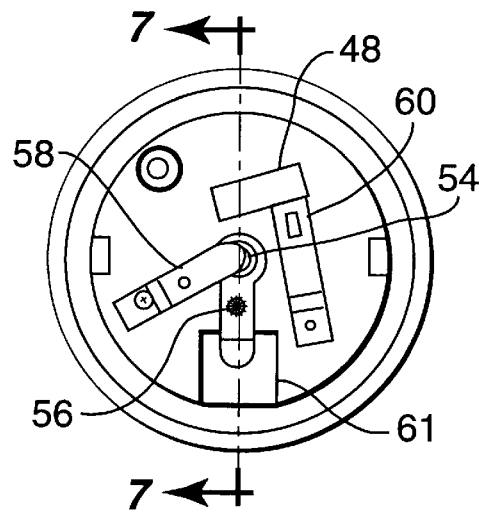
FIG. 6
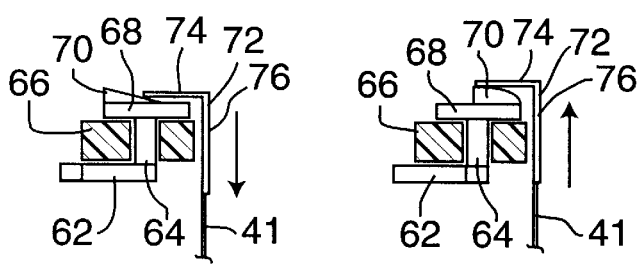
FIG. 8
FIG. 9
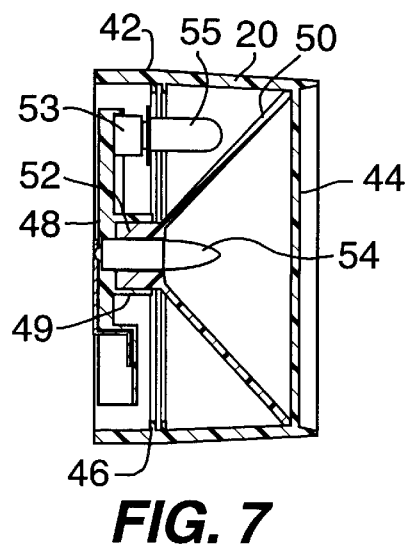
FIG. 7

MULTI-BATTERY FLASHLIGHT

FIELD OF THE INVENTION

The present invention relates to a multi-battery flashlight, and, more particularly to a multi-battery flashlight which provides a large power light beam and which is easy to hold.

BACKGROUND OF THE INVENTION

Most flashlights comprise a cylindrical housing containing one or more batteries therein, a cap on the end of the housing containing a light bulb, a reflector and a lens cover over the bulb. The bulb is electrically connected in series with the batteries so that it can be lit by the batteries. Generally a switch is provided to turn the light off and on. To achieve more power and a stronger light, the flashlight is generally provided with two or more batteries in series and/or a larger size battery. Generally, the batteries are mounted in end-to-end relation to easily obtain a series connection of the batteries. Thus, the larger the number of batteries used to obtain an increase in power, the longer the housing that is required. This provides a flashlight which is very long. If the batteries are mounted in side-by-side relation to shorten the length of the housing, the housing becomes larger in diameter. This makes the flashlight harder to hold in a user's hand. Therefore, it would be desirable to have a flashlight which contains a large number of batteries to provide larger light power, but which is also easy to hold in a user's hand.

SUMMARY OF THE INVENTION

A flashlight includes a housing having an outer wall, a closed end and an open end. The outer wall has a plurality of semi-cylindrical portions forming with the outer wall cylindrical pockets which are tangent with each other. Each of the pockets is adapted to receive at least one battery therein. A cap having an open end is removably secured to the open end of the housing and has a lens across its other end. A light bulb in within the cap, and a switch is on the housing and is adapted to turn the light bulb off and on.

BRIEF DESCRIPTION OF THE DRAWINGS

FIG. 3 is an end view of the handle of the flashlight taken along line 3—3 of FIG. 2;

FIG. 4 is a sectional view taken along line 4—4 of FIG. 2;

FIG. 5 is a sectional view taken along line 5—5 of FIG. 2;

FIG. 6 is a sectional view taken along line 6—6 of FIG. 2;

FIG. 7 is a sectional view taken along line 7—7 of FIG. 6;

FIG. 8 is a sectional view taken along line 8—8 with the switch being in its off position; and FIG. 9 is a sectional view taken along line 9—9 with the switch being in its on position.

DETAILED DESCRIPTION

Figure 1:
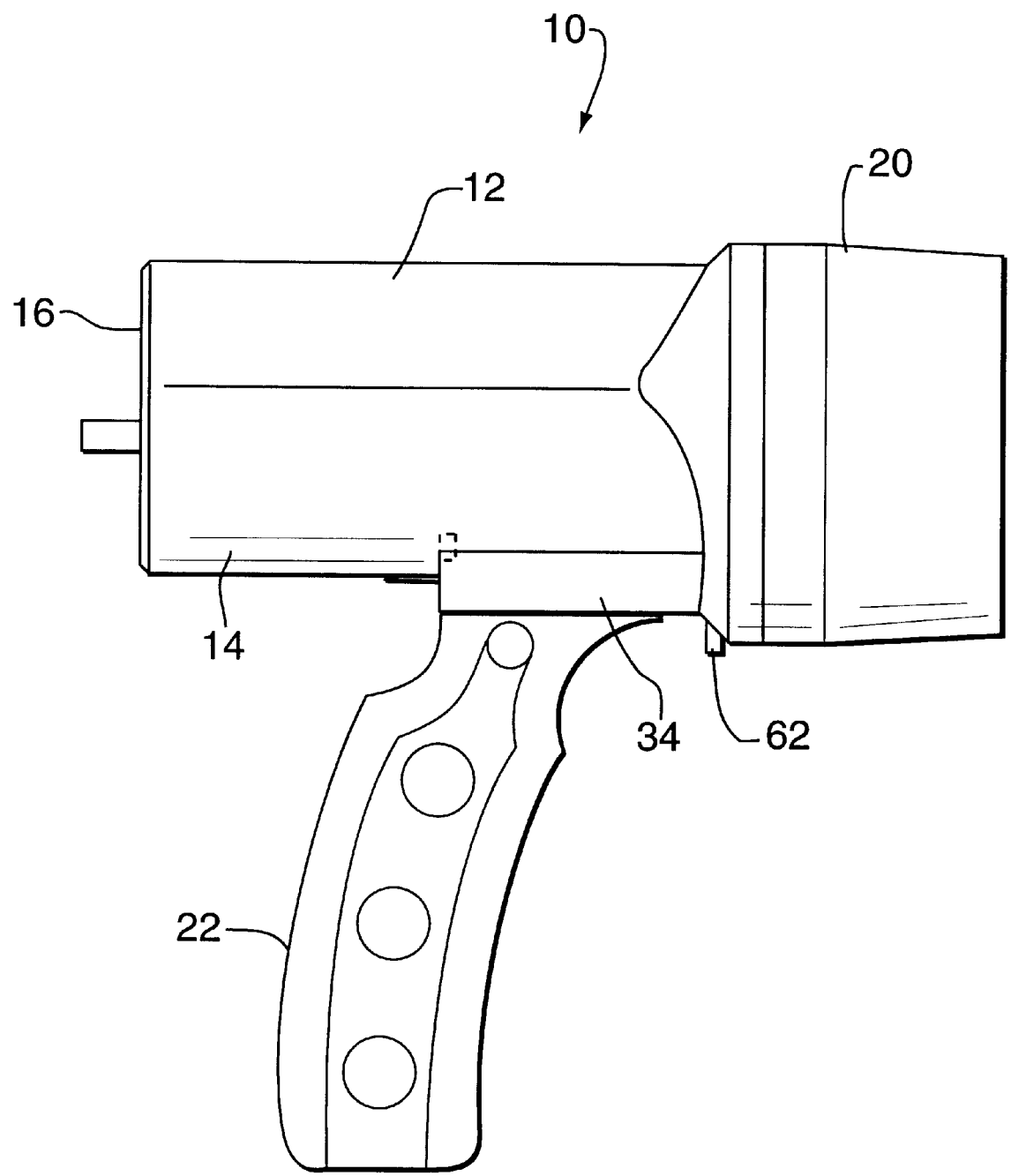
FIG. 1 is a side view of the flashlight of the present invention.
Figure 2:
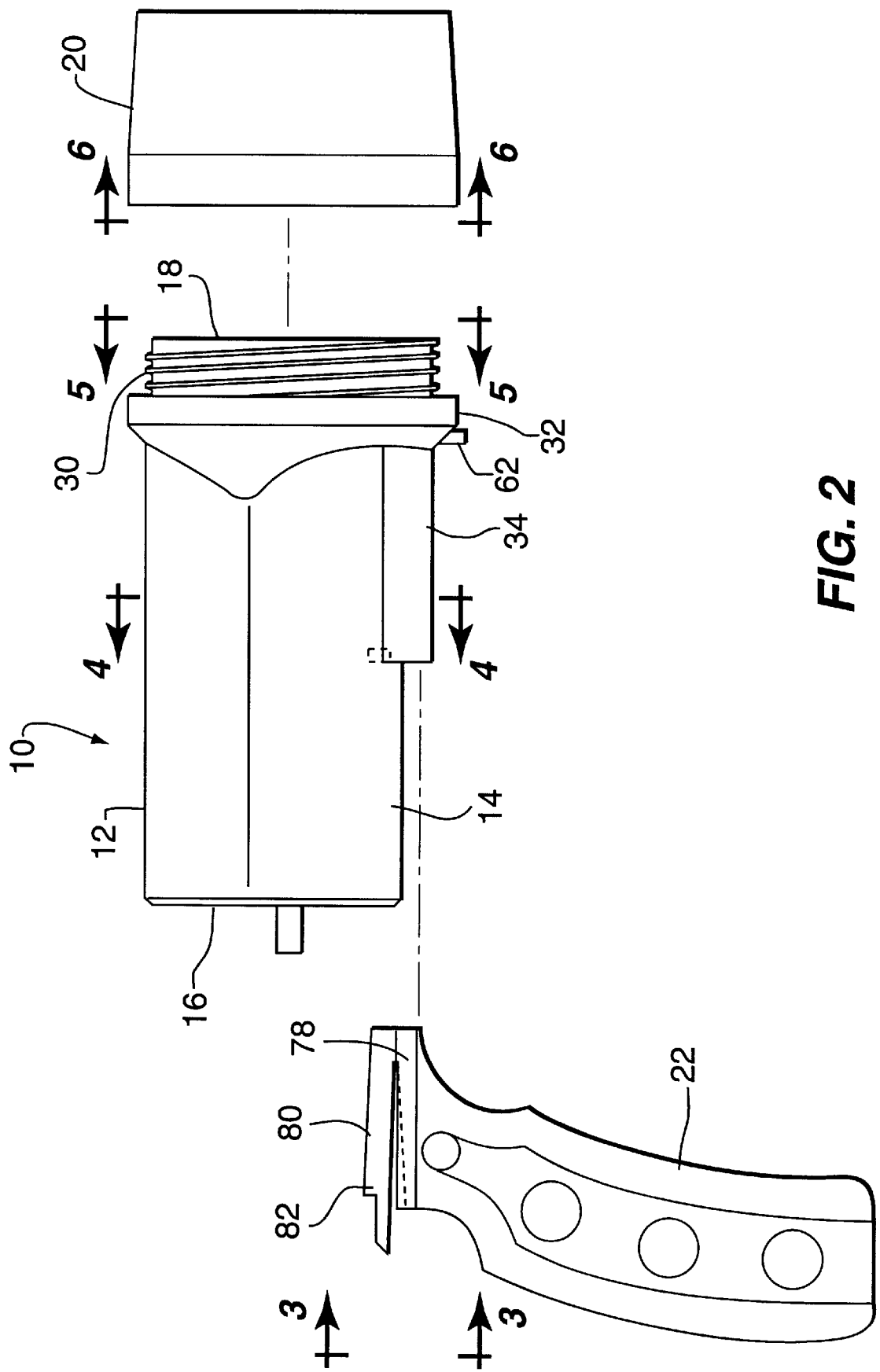
FIG. 2 is an exploded side view of the flashlight of the present invention.

Referring initially to FIGS. 1 and 2, the flashlight of the present invention is generally designated as 10. Flashlight 10 comprises a housing 12 having an outer wall 14, a closed bottom wall 16 and an open top end 18. A cap 20 is mounted on the top end 18 of the housing. A one piece handle 22 is releasably attached to the outer wall 14 and extends radially therefrom.

As shown in FIG. 4, the outer wall 14 of the housing 12 has three semi-cylindrical portions 24 which form within the housing 12 three cylindrical pockets 26 which are parallel to each other and which are tangent to each other. The semi-cylindrical portions 24 form the outer wall 14 with three lobes. Each pocket 26 contains at least two batteries 28 in end-to-end relation. The open top end 18 of the housing 12 is cylindrical and the outer surface thereof has a thread 30 extending from the open end of the housing 12 to a flange 32 spaced from the open end of the housing 12. The flange 32 extends radially outwardly from the top end 18. Extending longitudinally along the outer wall 14 from the flange 32 are a pair of spaced fingers 34. The fingers 34 extend toward each other to form therebetween a track 36. The track 36 is closed at its end adjacent the flange 32 and is open at its end away from the flange 32. As shown in FIG. 4, three conical contact springs 38, 39 and 40 are mounted on the bottom wall 16 of the housing 12 with each spring being in a separate pocket 26. The springs 38, 39 and 40 are of ane electrically conductive metal. The springs 38 and 39 are electrically connected together, and the spring 40 has one end connected to a metal wire 41 which extends along the inner surface of the outer wall 14 of the housing 12 to the open end of the housing 12. A battery 28 in each pocket 26 is seated on and makes electrical contact to the spring at the bottom of the pocket 26.

As shown in FIG. 7, the cap 20 comprises a cylindrical outer wall 42 open at one end and having a transparent lens 44 extending across its other end. The cap 20 has an internal thread 46 on the inner surface of the outer wall 42 adjacent the open end of the cap 20. The open end of the outer wall 42 of the cap 20 is adapted to fit over and thread onto the threaded portion 30 of the housing 12. A circular plate 48 of an insulating material, such as a plastic, extends across the open end of the outer wall 42 of the cap 20. A cylindrical wall 49 projects from the inner surface of the plate 48. A conical reflector 50 is mounted on the inner surface of the plate 48. The reflector 50 has a cylindrical wall 52 projecting from its smaller end which fits tightly into the cylindrical wall 49 on the plate 48. Thus the reflector 50 is firmly supported on and extends from the plate 48. A light bulb 54 extends through the cylindrical wall 52 of the reflector 50 and is threaded through a hole in the plate 48. The large end of the reflector 50 fits tightly into the junction between the outer wall 42 of the housing 40 and the lens 44 to support the plate 48, reflector 50 and light bulb 54 in the cap 20. The plate 48 has an internally threaded cylinder 53 thereon adjacent its edge. A spare bulb 55 is threaded in the cylinder 51 and is accessible in the event that the bulb 54 burns out.

As shown in FIG. 6, three contact strips 56, 58 and 60 of an electrically conductive metal, are mounted on and secured to the outer surface of the plate 48. The contact strip 56 extends from the light bulb 54 to a recess 61 in the outer edge of the plate 48 and is bent to extend into the recess 61. The contact strip 56 has a hole in its end through which the light bulb 54 extends. The contact strip 58 extends from the tip of the light bulb 54 across a portion of the plate 48 to a point where it can be contacted by an end of one of the batteries 28. The third contact strip 60 extends across the plate 48 and is positioned so that each of its ends can be contacted by a separate battery 28.

A switch is provided on the housing 12 to turn the flash light on and off. The switch comprises a switch lever 62 which extends through the outer wall 14 at the closed end of the track 36 so as to have one end outside the outer wall 14 and one end within the outer wall 14. The end of the switch level within the outer wall 14 is mounted on a hinge pin 64 which extends through and is rotatable in a hinge post 66. As shown in FIG. 5, the hinge post 66 extends radially inwardly from the inner surface of the outer wall 14. The switch lever 62 is on the side of the hinge post 66 away from the open end 18 of the housing 12. A cam plate 68 is mounted on the hinge pin 64 at the side of the hinge post 66 toward the open end 18 of the housing 12. The cam plate 68 has a cam projection 70 on its surface away from the hinge post 66. An L-shaped switch plate 72 of an electrically conductive metal has an arm 74 extending across the cam plate 68 and a leg 76 attached to the wire 41 which extends from the contact spring 40. The switch plate 72 is within the recess 61 in the plate 48 adjacent one end of the metal strip 56. When the switch lever 62 is rotated so as to bring the cam projection 70 into contact with the arm 74 of the switch plate 72 is moved in the direction shown in FIG. 9 to bring the arm 74 into contact with the end of the metal strip 56. This closes the electrical circuit between the batteries 28 and the light bulb 54 to light the light bulb 54. When the switch lever 62 is rotated so as to move the cam projection 72 away from the arm 74 as shown in FIG. 8, the arm is moved away from the metal strip 56. This opens the electrical circuit and turns the light bulb 54 off.

The handle 22 is shaped so that it can be gripped in the hand of a user. The handle 22 has a rail 78 at its top end which is shaped to slide between the fingers 34 of the track 36. A spring locking strip 80 extends along the top of the rail 78 and is secured at its front end to the top of the track 36. The spring locking strip 80 has a pin 82 at its back end which can snap into a detent (not shown) in the track 36 so as to lock the handle to the housing 12. By pressing down on the back end of the spring locking strip 80, the pin 82 can be moved out of the detent to allow the handle to be slid out of the track 36 so as to allow the handle 22 to be removed from the housing 12 without the need of any special tools.

Thus, there is provided by the present invention a flashlight 10 having a housing 12 which contains three stacks of batteries 28 in side-by-side relation with at least two batteries in each stack. The batteries 28 are electrically connected in series with a bulb 54 by means of the metal strips 56, 58 and 60 in the cap 20, the springs 38, 39 and 40 in the bottom of the housing 12, the wire 41 and the switch. Having at least six batteries in the flashlight 10 provides sufficient current to achieve a more powerful beam of light. However, by having the batteries 28 is side-by-side stacks, they take up a minimum amount of space so as to keep the flashlight 10 relatively small. The switch is located at the front end of the housing 12 adjacent the front end of the handle 22 so that it can be easily operated by a finger of the hand which is holding the flash light 10 by the handle 22. The handle 22 allows for ease of holding the flashlight 10. However, the handle 22 is easily removable without the need of any special tools if desired. Even if the handle is removed, the flashlight can be easily held in the hand of the user. By forming the housing 12 with three pockets, there is provided small lobes on the external surface of the housing 12 and the housing 12 can be held by placing the hand around any one of the lobes. Thus, the lobes permit ease of holding the flashlight 10 even without the handle 22. In addition, the pockets allow for ease of removing and replacing the batteries 28 and hold the batteries 28 in position in the housing 12.

What is claimed is:

1. A flashlight comprising:

a housing having an outer wall, a closed end and an open end, the outer wall having a plurality of semi-cylindrical portions at both the inner and outer surfaces of the outer wall forming within the outer wall pockets which are tangent with each other and each of which is adapted to contain at least one battery and lobes at the outer surface of the outer wall;

a cap having an open end which is removably secured to the open end of the housing and a lens across its other end, a light bulb within the cap; and a switch on the housing adapted to tun the light bulb on and off.

2. The flashlight of claim 1 in which the housing has three semi-cylindrical portions each forming a pocket within the housing which is adapted to receive at least one battery and three lobes at the outer surface.

3. The flashlight of claim 2 in which each of the pockets is adapted to receive a stack of at least two batteries in series.

4. The flashlight of claim 1 further comprising a one piece handle removable secured to the outer surface of the housing and extending radially therefrom.

5. The flashlight of claim 4 in which the housing has a track extending longitudinally along its outer surface and the handle has a rail at its end which slidably fits into the track.

6. The flashlight of claim 5 in which the handle and housing have one piece releasable interlocking means to lock the handle to the housing but allow the handle to be removed from the housing without the need of any special tools.

7. The flashlight of claim 5 in which the track extends from adjacent the open end of the housing and the switch is in the housing adjacent the end of the track which is adjacent the open end of the housing.

8. The flashlight of claim 2 in which the cap has a plate of insulating material extending across the open end thereof, a conical reflector mounted on and extending between the plate and the lens with the smaller end of the reflector being secured to the plate, and the bulb extends through the plate at the smaller end of the reflector.

9. The flashlight of claim 8 in which the plate in the cap has three flat contact strips of a conductive metal on its surface facing the housing, and there are three flat contact springs in the bottom of the housing, said contact strips and springs being arranged to electrically connect the batteries in series with the light bulb.

10. The flashlight of claim 9 in which two of the contact springs are connected together, and the third contact spring is connected by a wire extending along the inner surface of the housing to the switch.

11. The flashlight of claim 10 in which one of the contact strips engages the light bulb at one end and is engageable by the switch at its other end, a second of the contact strips contacts the light bulb at one end and a battery at its other end, and the third contact strip is adapted to engage a separater batter at each of the ends of the third contact strip.

12. The flashlight of claim 8 in which the housing and cap are threaded at their open ends and are adapted to be threaded together.

\* \* \* \* \*